United States Patent
Russell

Patent Number: 5,928,450
Date of Patent: Jul. 27, 1999

[54] PROCESS OF MAKING FRACTAL TUBES

[76] Inventor: Daniel Nelson Russell, 4610 W. Gray St., #303, Tampa, Fla. 33609

[21] Appl. No.: 09/018,932

[22] Filed: Feb. 5, 1998

[51] Int. Cl.$^6$ .................................. B32B 1/06; B32B 1/08
[52] U.S. Cl. .......................... 156/169; 156/172; 156/173; 156/294; 156/296; 156/272.8; 156/308.2
[58] Field of Search ...................................... 156/294, 296, 156/272.8, 308.2, 169, 173, 172

[56] References Cited

U.S. PATENT DOCUMENTS

| | | |
|---|---|---|
| 4,749,487 | 6/1988 | Lefebvre . |
| 5,424,054 | 6/1995 | Bethune et al. . |
| 5,543,002 | 8/1996 | Brinda et al. . |
| 5,707,724 | 1/1998 | Russell . |

OTHER PUBLICATIONS

Yakobson et al, Fullerene Nanotubes: $C_{1,000,000}$ & Beyond, American Scientist, vol. 85, pp. 324–336, Aug. 1997.

Primary Examiner—Sam Chuan Yao

[57] ABSTRACT

The process for manufacturing fractal hollow tubes is presented. In order to break through present engineering barriers it is necessary to greatly increase the strength-to-weight ratio of the materials used in construction. The present invention accomplishes this by a process in which the mass and atomic dimentions are minimized while order is preserved in accordance to the quantum atomic compressibility law, $E=3\ h^2/8\ ml^2$. Hollow fibers are formed into tubes which are formed into hollow cylinders which form the walls of hollow columns, etc. In this way the energy available for material strength is realized so that support structures that are stronger than $10^9$ Pascals and less dense than ½ g/cc are built. This process of fractal microengineering will allow the construction of aircraft, and structures having performance capabilities that were not possible before.

15 Claims, 1 Drawing Sheet

PROCESS OF MAKING FRACTAL TUBES

BACKGROUND

The present invention relates to the process of making fractal tubes.

Hollow carbon fibers only one atom layer in wall thickness and measured to be 12 Angstroms thick are disclosed by Bethune et al, in U.S. Pat. No. 5,424,054. There is no process taught to employ fractal engineering to build the walls of larger tubes from these fibers and then to build the walls of cylinders out of these tubes as a means to build support members. It is desirable to develop a process for making support members for construction in this fractal manner because of the expected low density and low weight and high strength-to-weight ratio of members so made. Yakobsaon and Smalley in American Scientist, vol.85, p332 (August 1997) disclose the experimental evidence that the strength of ropes made from hollow carbon nanotubes is expected to be 100 times stronger than steel and top 130 gigapascals at only one-sixth the weight of steel.

The advantage of a process that minimizes mass while maintaining order in construction is explained by the quantum atomic compressibility law, $E=3h^2/8ml^2$, which says that the strength with which an atom or molecule resists compression is proportional to the product of its mass and the square of its diameter. This principle is taught in my prior U.S. Pat. No. 5,707,724 in which the field of Fractal Microengineering is introduced. Therefore, there is a need to provide such a process to enable the construction of materials that are stronger than steel, yet much less dense than water.

SUMMARY

An object of the instant inventive process is to make economical, practical, versatile, very strong structures having densities of less than ½ g/cc. Another object of the invention is to provide a process by which the tremendous strength of fullerene nanotubes can be transferred to macroscopic structural support members useful in construction industries. It is another object to fully exploit the quantum atomic compressibility equation by providing a process of manufacture that yields materials of a maximum strength-to-weight ratio.

These and other objects are achieved according to the present invention by a process of making fractal hollow tubes by building tubes from fibers that are hollow and building hollow cylinders from these hollow tubes and building hollow columns out of these cylinders, and so on. The fractal nature of this process improve& the thermal insulative value and multiplies the improvement in strength-to-weight ratio that would be gained from using only one layer of hollow structures. Specifically the process of making fractal tubes comprises the steps of: forming a hollow Cube by placing at least one fiber made of a chosen material around a removable cylindrical template such that the fiber forms the-wall of the tube; bonding the fiber in place; forming a hollow cylinder by placing at least one tube around a removably hollow cylindrical form such that the wall of the cylinder is formed by the tube; bonding the tube in place such that the wall of the cylinder is at most one-half g/cc in density. In another embodiment the removable template and the removable form are not included in the above process steps, and formation around a cylindrical space is done instead.

These and other objects and advantages will become more apparent from the following drawings when taken in conjunction with the description of preferred embodiments.

DESCRIPTION OF PREFERRED EMBODIMENTS

The present invention is a process for manufacturing fractal tubes for use in constructing support members. The inventive process is fundamentally an application of the quantum atomic compressibility law, $E=3h^2/8ml^2$, where h is Plank's constant, m is the atomic mass, and l is the atomic diameter. E is the energy with which an atom or molecule resist compression and is a measure of strength. Thus a maximum strength of a given material occurs when m and l are minimized, as long as the order parameters remain invariant.

Figure 1A:
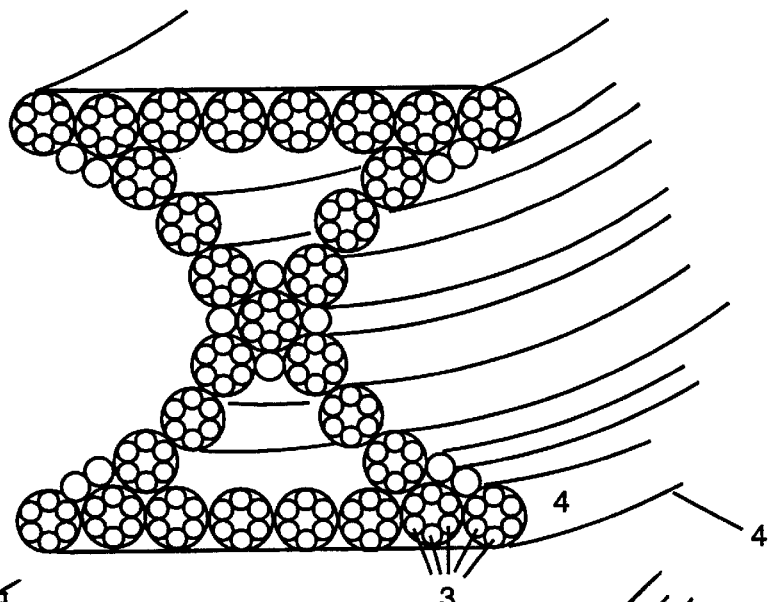
FIG. 1A is a cross sectional view of a reinforcement constructed of a stack of hollow columns made from hollow cylinders which are made from hollow tubes which are built out of hollow fibers.
Figure 1B:
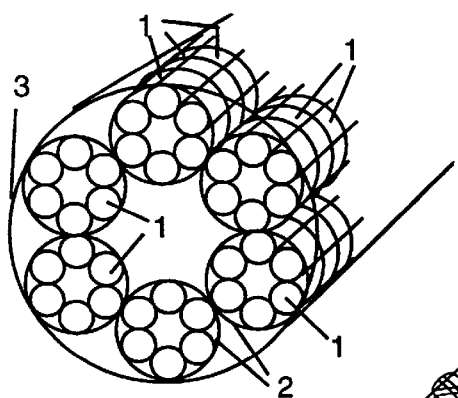
FIG. 1B is an enlarged view of one of the cylinders designated with the numeral, 3, and shown in FIG 1A. In an embodiment in which the fibers and tubes are placed in parallel, hollow hexagons.
Figure 1D:
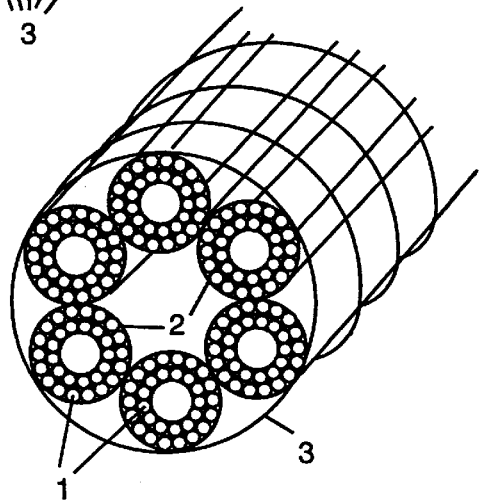
FIG. 1D is an enlarged view of one of the cylinders 3 shown in FIG. 1A in an embodiment in which the tubes are formed from concentric layers of hollow fibers.
Figure 1C:
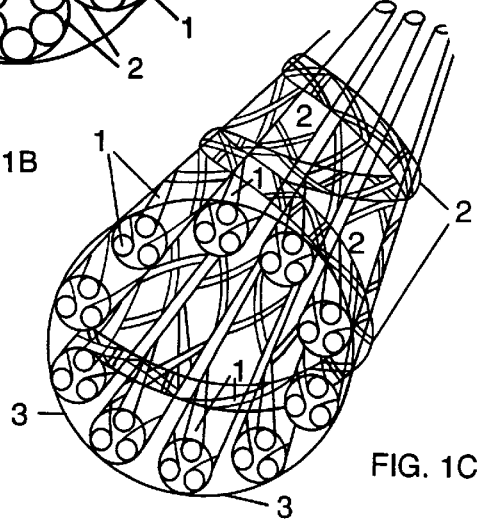
FIG. 1C is an enlarged view of one of the cylinders 3 shown in FIG. 1A in an embodiment in which the fibers are formed into an open weave cloth and formed into tubes, and the tubes are formed into an open weave cloth and rolled to form the cylinder.

FIG. 1A is a cross sectional view of a support beam constructed fractally by the process of stacking and bonding hollow columns 4 made of bonded hollow cylinders 3 made bonded hollow tubes 2 made from bonded hollow fibers 1. FIGS. 1B, 1C, and 1D show three embodiments for making the hollow cylinders 3 of FIG. 1A. The process of making fractal tubes comprises the steps of forming a hollow tube 2 out of any chosen material from at least one fiber 1 placed around a cylindrical template, such as a wire, and bonded in place and removing the template. The fibers 1 are stacked and coiled to get this formation. In another example the fibers 1 are hollow-braided into hollow tubes 2. The tubes 2 are then placed around a hollow form to make hollow cylinders 3 upon bonding. The cylinders 3 have a density of at most ½ g/cc. The removable form is then removed. In another example the form is left in place to serve as a reinforcement which also guarantees the constancy of the internal diameter of the cylinder 3. The inside diameter of the hollow tubes 2 and cylinders 3 are at least 30% of their respective outside diameter. The cylinders 3 are then shaped around a hollow cylindrical, removable object and bonded in place such that a hollow column 4 is formed having an inside diameter at least 30% of its outside diameter.

The fibers 1 are, optisally, hollow, carbon tubes having a wall thickness of a single atomic layer. The wall thickness is defined to be the difference between the outside diameter and the inside diameter. The columns 4 are stacked and bonded to form support beams and such as the one shown in FIG. 1A. Examples of materials from which the fiber is made are: carbon polymeric fullerene, fiberglass, hydrocarbon polymer, titanium, aluminum, steel, metal alloy, and any hybrid combination thereof. The step of bonding is done, for example, by applying a bonding agent such as resin, molten metal ceramic and cement depending upon the fiber material and the application requirements. The bonding agent contains at least 10% microspheres by volume which are made, for example, out of any material chosen front diamond, glass, $C_{60}$, fullerene, hydrocarbon polymer, and metal. The step of bonding is done, in another example, by any method chosen from; laser welding; welding; diffusion bonding; and cross polymerization.

FIG. 1B shows a cylinder which is formed by a process in which at least 6 fibers 1 are placed in a hexagonal array parallel to the long axis of a removable template cylindrical, such as a wire, and another fiber is coiled around them to form hollow tubes 2. The tubes so formed are then placed in a hexagonal array around a removable hollow cylindrical form to make hollow cylinders 3. Hollow columns 4 are then formed by placing at least 6 hollow cylinders 3 in a hollow hexagonal formation around a removable cylindrical object. All the structures are bonded. The lateral surfaces of the tubes 2 in FIGS. 1B & 1C show hollow fiber coiled to from each tube 2. Thus, the tubes 2 can be made without the other central fibers 1.

FIG. 1C shows another way to construct and bond the cylinders in which a mesh cloth is formed out of at least one fiber 1 and that cloth is shaped around the removable cylindrical template to form the tubes 2 which are then also formed into woven material which is then shaped around the removable hollow cylindrical form to make cylinders 3. The cloth and woven material so formed is also used to reinforce panels and sheet metal. When placed into molten metal prior to solidification, the metal fiber chosen must have a melting temperature at least as high as the temperature of the molten material at the time of bonding. The resulting fractal tube reinforced sheet metal has a highly reduced density and is stronger than pure random metal.

FIG. 1D shows another way to make the cylinders 3 of FIG. 1A in which concentric layers of fibers 1 are placed around the removable cylindrical template, such as a wire, to form hollow tubes 2. The lateral surface in FIG. 1C shows tube 2 coiled to form the cylinder 3, which can be made in this way without the other central parallel tubes 2.

In another embodiment tubes 2 are formed from fibers 1 without the use of any template. They are simply shaped around a central cylindrical empty space. This is most easily done with metal fibers 1. The tubes 2 are also formed around a central cylindrical empty space to make cylinders 3. The fibers 1 and tubes 2 are bonded in place such that the cylinder wall density is at most ½ g/cc. Optimally, carbon nanotubes are the fiber.

It has been found that a hybrid combination of Dupont Kevlar® and Owens Corning Al-silicate glass works well and lowers materials costs in composite applications. A hybrid combination of Aluminum or steel with titanium works well for the fibers 1 in metal applications.

In welding reinforced structures, more fiber having a higher melting point than the welding temperature is added at the welding site. This ensures the integrity and continuity of the fiber substructure across the weld. In another example of welding a sleeve is placed across a joint overlapping each part to be joined. The sleeve is then brought up to the annealing temperature such that a thermal diffusion bond is formed between the bonding agent and the sleeve. In another example a welding clamp having protruding portions is built into the fiber reinforced structure. The protruding portions are then welded by conventional welding methods.

The inventive process of making fractal tubes allows the fabrication of structural members having superior strength exceeding $10^9$ Pascals, or at least 100 times the strength of steel and having minimal weight less than one-sixth that of steel. This will allow the construction of and structures having performance parameters never possible before. Accordingly, for all these reasons set forth, it is seen that the process of the instant invention represents a significant advancement in the art of manufacturing fractal tubes and has substantial commercial merit.

While there is shown and described herein certain specific processes embodying the invention, it will be manifest to those skilled in the art that modifications may be made without departing from the spirit and scope of the underlying inventive concept. The present invention shall not be limited to the particular processes herein shown and described, except by the scope of the appended claims.

What is claimed is:

1. The process of manufacturing fractal tubes comprising the steps of: forming a hollow tube by placing at least one fiber made of a chosen material around a removable cylindrical template such that said fiber forms the wall of said hollow tube; bonding said fiber in place; forming a hollow cylinder by placing at least one said hollow tube around a removable hollow cylindrical form such that the wall of said cylinder is formed by said tube; bonding said hollow tube in place such that the wall of said cylinder has a density at most one half gram per cubic centimeter.

2. The process of claim 1 wherein both said template and said form are removed, and said hollow tube is formed with an inside diameter at least 30 percent of its outside diameter, and said hollow tube has a wall thickness of at most 30 microns.

3. The process of claim 1 wherein at least one said hollow cylinder is formed around a removable cylindrical object and bonded in place such that a hollow column is formed.

4. The process of claim 3 wherein at least two said hollow columns are stacked and bonded.

5. The process of claim 4 wherein the step of bonding is done by one process selected from: welding; laser welding; thermal diffusion bonding; and cross polymerization, and the process of welding includes the addition of said fiber at the welding site.

6. The process of claim 3 wherein the step of placing said fiber around said template is done by placing at least 6 fibers around said template parallel to the long axis of said template, and the step of placing said hollow tube around said form is done by placing at least 6 hollow tubes around said form parallel to the long axis of said form, and the step of placing said hollow cylinder around said cylindrical object is done by placing at least 6 hollow cylinders around said object parallel to the long axis of said object.

7. The process of claim 3 wherein the step of placing said fiber around said template is done by first forming a cloth around said template such that said cloth is formed from said fiber, and the step of placing said hollow tube around said form is done by first forming a woven material from said hollow tube and then forming said woven material around said form.

8. The process of claim 3 wherein the step of placing said fiber around said template is done by placing concentric layers of said fiber around said template.

9. The process of claim 1 wherein said chosen material is one selected from the group of: fiberglass; carbon polymer; hydrocarbon polymer; titanium; aluminum; steel; and any hybrid combination of materials selected from this group.

10. The process of claim 9 wherein the step of bonding is done by the application of a bonding agent containing at least 10 percent microspheres by volume, said bonding agent is one selected from: resin, molten metal, cement, and ceramic.

11. The process of claim 1 wherein said fiber is a hollow fiber having a wall thickness of at most 30 microns.

12. The process of claim 11 wherein said hollow fiber has a wall thickness of at most one atomic layer.

13. The process of manufacturing fractal tubes comprising the steps of: forming a hollow tube by placing at least 1 fiber around a central cylindrical space; bonding said fiber in place; forming a hollow cylinder by placing at least 1 said hollow tube around a hollow cylindrical space; bonding said tube in place such that a hollow cylinder is formed having a wall density at most one half gram per cubic centimeter.

14. The process of claim 13 wherein said fiber is hollow fiber, said hollow fiber has a wall thickness of at most 30 microns, and the step of bonding is one process selected from the group of: glueing; thermal diffusion bonding; and welding, said process of welding includes the addition of said fiber at the welding site.

15. The process of claim 14 wherein said hollow fiber has wall thickness of at most one atomic layer.

* * * * *